United States Patent [19]

Baddour

[11] 4,111,812
[45] Sep. 5, 1978

[54] RECOVERING SURFACTANT

[75] Inventor: Raymond F. Baddour, Belmont, Mass.

[73] Assignee: Energy Resources Co. Inc., Cambridge, Mass.

[21] Appl. No.: 772,670

[22] Filed: Feb. 28, 1977

[51] Int. Cl.$^2$ .................. B01D 13/00; B01D 31/00
[52] U.S. Cl. .............................. 210/257 M; 210/259; 210/321 R; 210/433 M
[58] Field of Search ............... 210/321, 22, 321 R, 210/21, 186, 23 R, 23 H, 23 F, 257 M, 259, 433 M

[56] References Cited

U.S. PATENT DOCUMENTS

| 3,977,967 | 8/1976 | Trulson et al. .................. 210/23 F |
| 4,000,065 | 12/1976 | Ladha et al. .................. 210/321 R |

FOREIGN PATENT DOCUMENTS 2,549,882  8/1974  Fed. Rep. of Germany ........ 210/23 H

OTHER PUBLICATIONS

"The Treatment of Waste Emulsified Oils by Ultrafiltration" by P. A. Bailey, Filtration and Separation, Jan./Feb. 1977, presented 9/28/76.
The Condensed Chemical Dictionary, 8th Ed., Van Nostrand-Reinhold Company, copyright 1971, p. 639, "2-N-Octanol."
The Condensed Chemical Dictionary, 8th Ed., Van Nostrand Reinhold Company, copyright 1971, p. 840, "Surfactant."
"New Separation Technique for the CPI," A. S. Michaels Chemical Engineering Progress, vol. 64, No. 12, Dec. 1968, pp. 31–43.

*Primary Examiner*—Charles N. Hart
*Assistant Examiner*—David R. Sadowski

[57] ABSTRACT

In one aspect a process for breaking an oil/water/surfactant emulsion obtained from an oilfield after chemical flooding comprises ultrafiltering the emulsion. In another aspect the oil and water phases produced from the emulsion so broken are further treated to recover the surfactant therefrom. The water phase is subjected to ultrafiltration or reverse osmosis to concentrate the surfactant. The oil phase is washed with water and then separated from the wash water and surfactant, and the surfactant is finally separated from the wash water.

2 Claims, 4 Drawing Figures

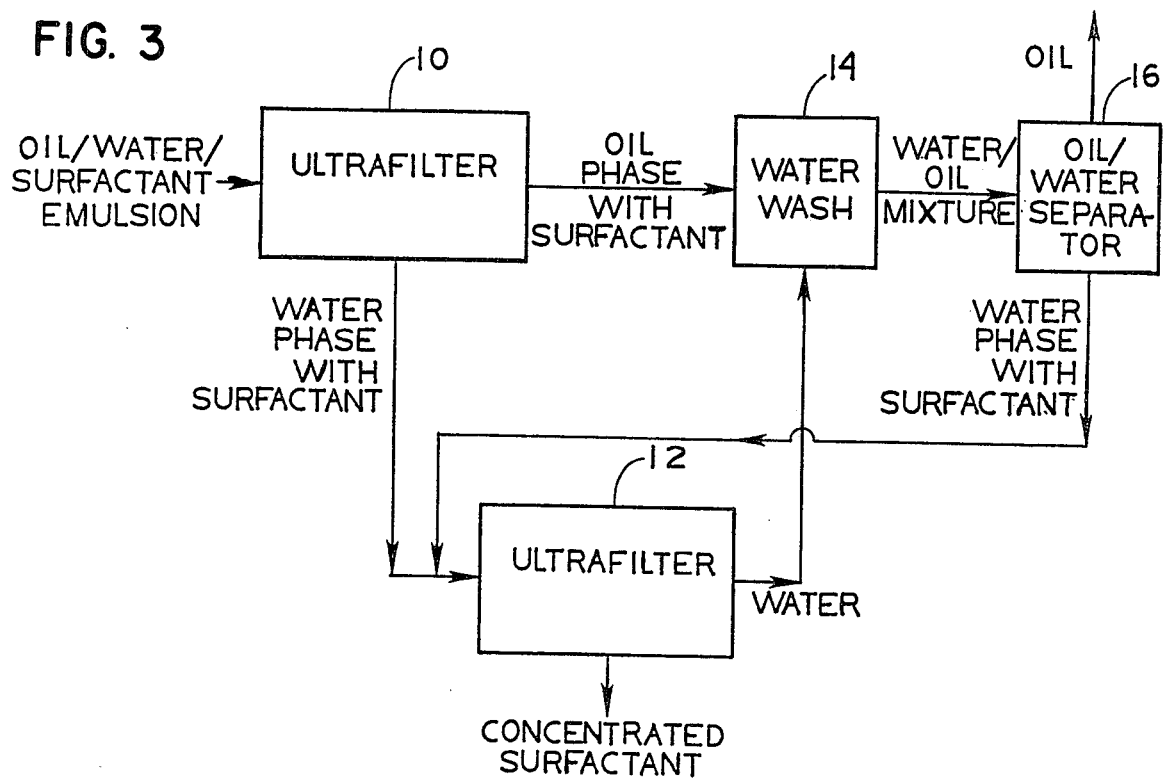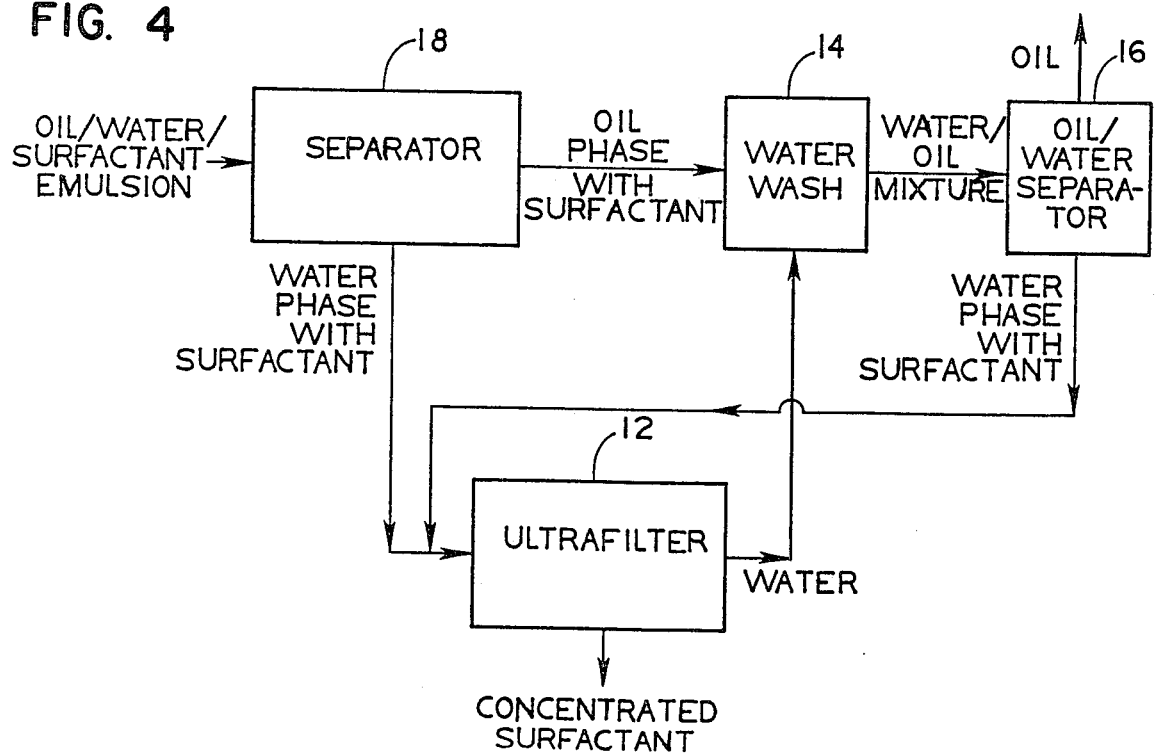

RECOVERING SURFACTANT

FIELD OF THE INVENTION

This invention relates to breaking oil/water/surfactant emulsions obtained from an oilfield after it has been chemically flooded and to recovering the surfactant from such emulsions.

BACKGROUND OF THE INVENTION

Chemical flooding of oilfields with surfactant and water in order to repressurize them is a known type of tertiary oil recovery. The fluids so produced are emulsions of oil, water, and surfactant. One problem has been separating out the components of the emulsion. It would be desirable to recover as much surfactant as possible from the emulsion for reuse in subsequent flooding operations. Efficient and economical separation of the water from the oil would also be desirable, to facilitate subsequent refining of the oil. Conventional field treatment of such emulsions has included the following: settling, heating or distilling at atmospheric pressure, heating or distilling at elevated pressure, centrifugation (>20,000 rpm), electrical dehydration, and chemical demulsification. Chemical demulsification, which is in wide use, often involves addition of substantial quantities of chemicals, with attendant costs. Further, such chemicals usually need to be tailored for the production from a particular oilfield. A technique for surfactant recovery having wider applicability to emulsions from different fields would be desirable.

Ultrafiltration has been used in laboratory scale studies for the separation of very dilute oil-in-water emulsions such as might be found in seawater after oil spills, not the type of emulsion obtained from an oilfield after chemical flooding. U.S. Department of Transportation, U.S. Coast Guard Study No. 734305.2.

SUMMARY OF THE INVENTION

I have discovered that an oil/water/surfactant emulsion obtained after chemical flooding can be broken by ultrafiltration into an oil phase and a water phase. I have further discovered that the water and oil phases of an emulsion so broken or broken by conventional methods can be further treated as follows to recover the surfactant therefrom: the water phase is subjected to ultrafiltration or reverse osmosis to concentrate the surfactant, and the oil phase is first washed with water to extract the surfactant from the oil, the resultant oil-wash water mixture is then separated either conventionally or by ultrafiltration or reverse osmosis, and the surfactant is finally separated from the wash water.

My invention permits economical emulsion breaking without the need for adding more chemicals to the oil and with chemical ultrafiltration apparatus, requiring application of relatively low pressures. Further, my invention provides a simple, economical, and fast way, adaptable for continuous processing, of recovering surfactant from these emulsions.

In more particular aspects, the invention permits controlling the ratio of surfactant partitioned between the oil and water phases by pretreating the emulsion with a cosurfactant, using either oleophilic or hydrophilic ultrafiltration or reverse osmosis membranes, and using water produced by the ultrafiltration of the water phase to wash the oil phase.

PREFERRED EMBODIMENTS

I turn now to description of presently preferred embodiments of the invention.

DRAWINGS

FIG. 3 is a flow sheet describing a third embodiment of the invention; and

FIG. 4 is a flow sheet describing a fourth embodiment of the invention.

DESCRIPTION

Figure 1:
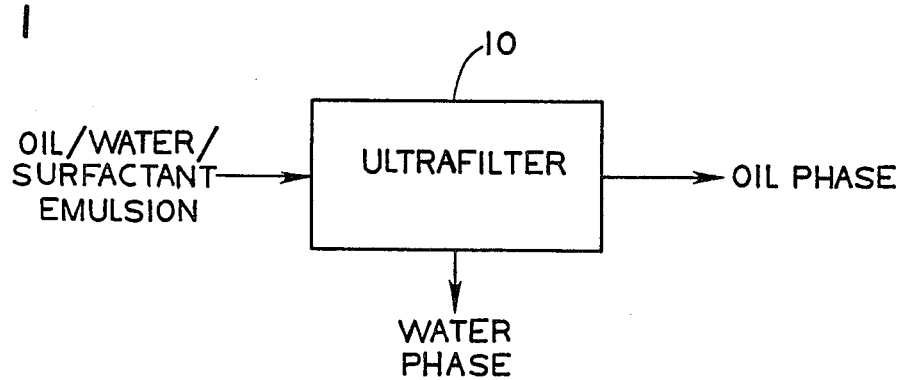
FIG. 1 is a flow sheet describing one embodiment of the invention.

The embodiments shown in the drawings and their operation are now described.

FIG. 1 shows ultrafilter 10. A typical ultrafilter that can be used is a cell employing the Abcor HFD hydrophobic flat membrane made by Abcor, Inc. of Wilmington, Massachusetts. In operation an oil/water/surfactant emulsion is applied against the membrane under pressure, which can vary from 1 to 10 atmospheres, and the emulsion is broken into an oil phase and a water phase, the latter permeating through the membrane. Ideally, the surfactant would end up in either the oil or water but not in both. In actual practice, the surfactant will partition between both phases. In order to vary the surfactant partitioning ratio in favor of one phase over the other, a cosurfactant is added to the emulsion prior to introduction into ultrafilter 10. One such cosurfactant that has been found to favor the water phase (permeate) is 2-octanol.

In laboratory examples using an emulsion of Nujol mineral oil, water, and sodium lauryl sulfonate surfactant, having a feed composition of 83.3 $cm^3$ of water and 16.7 $cm^3$ of oil, the following data were obtained based on use of the Abcor HFM and HFD flat membranes and pretreatment of the emulsion with 2-octanol or n-butanol as the cosurfactant:

Table 1

| CO-SURFACTANT/SURFACTANT RATIO | HFM MEMBRANE ||||||
|---|---|---|---|---|---|---|
| | COSURFACTANT USED: 2-OCTANOL ||| COSURFACTANT USED: n-BUTANOL |||
| | EFF 1 | EFF 2 | FLUX | EFF 1 | EFF 2 | FLUX |
| 0.5 | .48 | .88 | .83 | .47 | .84 | .54 |
| 1 | .46 | .93 | .35 | .45 | .90 | .48 |
| 2 | .47 | .86 | .23 | .43 | .876 | .37 |
| 5 | .44 | 1.04 | .11 | .422 | 1.0 | .17 |
| 10 | .44 | .99 | .08 | .39 | 1.2 | .10 |
| HFD MEMBRANE ||||||| 
| 0.5 | .63 | 1.35 | .19 | .57 | .90 | .23 |
| 1 | .61 | .92 | .16 | .54 | .94 | .19 |
| 2 | .64 | 1.21 | .08 | .54 | .97 | .15 |
| 5 | .622 | 1.15 | .08 | .541 | 1.03 | .09 |
| 10 | .52 | 1.09 | .05 | .523 | 1.13 | .06 |

$$\text{EFF 1} = \text{Efficiency 1} = \frac{\text{weight of surfactant in permeate (water phase)}}{\text{weight of surfactant in feed}}$$

$$\text{EFF 2} = \text{Efficiency 2} = \frac{\text{weight of surfactant in permeate (water phase)}}{\text{weight of surfactant in oil phase}}$$

$$\text{FLUX} = \frac{\text{weight of permeate}}{\text{area of membrane} \times \text{time}}$$

Pressure of system: 40 psig
Temperature of system: 72° F

Table 1-continued

| Weight of surfactant: | 0.1 gm |
|---|---|

Table 2

CONCENTRATION (μg/ml) OF SURFACTANT IN PERMEATE AND OIL PHASE

| COSURFACTANT/ SURFACTANT RATIO | HFM MEMBRANE COSURFACTANT USED: | | HFD MEMBRANE COSURFACTANT USED: | |
|---|---|---|---|---|
| | 2-OCTANOL | n-BUTANOL | 2-OCTANOL | n-BUTANOL |
| .5 permeate (water phase) | 697 | 682.3 | 825 | 761.3 |
| oil phase | 649 | 678.2 | 557 | 761 |
| 1 permeate | 668.5 | 630.1 | 816.8 | 720 |
| oil phase | 594 | 611.2 | 798.4 | 703.2 |
| 2 permeate | 667 | 594.1 | 816 | 705 |
| oil phase | 649 | 594 | 631 | 668 |
| 5 permeate | 601.3 | 562.3 | 798 | 694 |
| oil phase | 501.3 | 506.2 | 649.8 | 629.5 |
| 10 permeate | 581.3 | 510.5 | 668.3 | 668 |
| oil phase | 531.3 | 389.9 | 575.5 | 556 |

In the test examples, the surfactant concentration was higher in the permeate (water phase) than in the oil phase. Smaller molecules (water and surfactant) could pass through the membrane, while oil molecules were too large to pass through the membrane.

Figure 2:
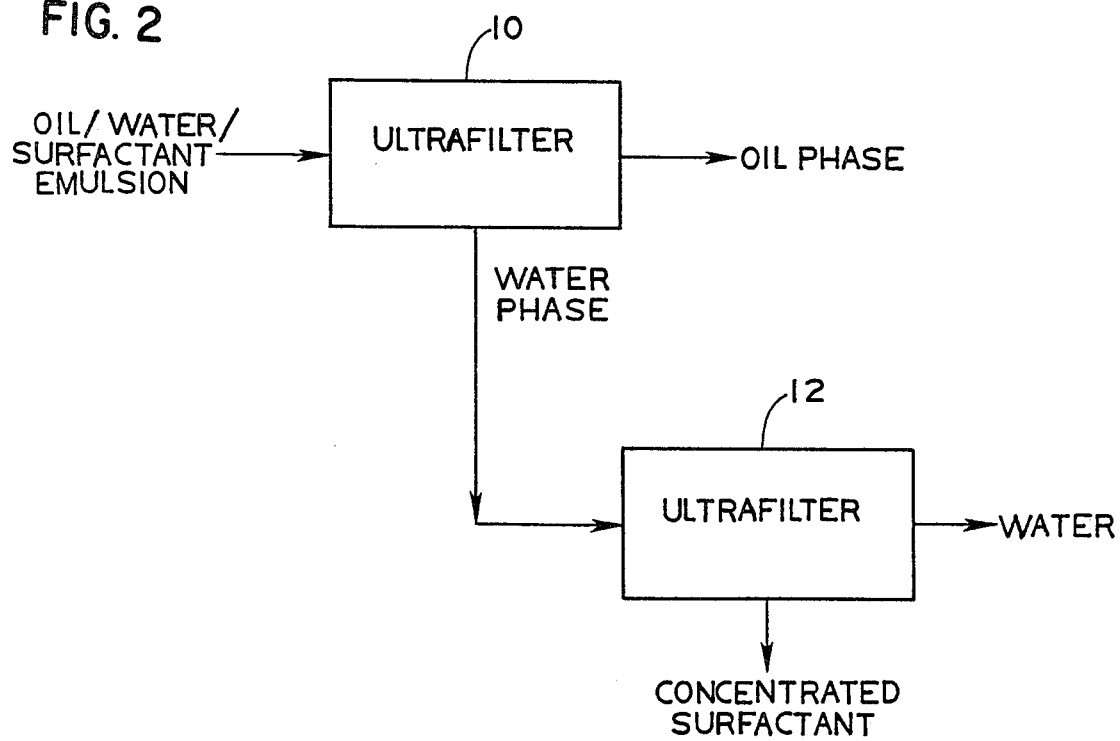
FIG. 2 is a flow sheet describing a second embodiment of the invention.

In FIG. 2, ultrafilter 10 is shown connected to a second, downstream ultrafilter 12. This embodiment permits one to recover surfactant from the water phase. It does not attempt to recover surfactant from the oil phase. This embodiment is particularly useful when the surfactant partitioning is heavily in favor of the water phase, and the amount of surfactant left in the oil phase does not economically warrant recovery.

In FIG. 3 surfactant is recovered from both oil and water phases. The recovery of surfactant from the water phase is done the same way as shown in FIG. 2. As for the oil phase, it first enters water wash 14, where it is washed with water from the ultrafilter 12 in order to extract the surfactant from the oil. The resulting oil/water/surfactant mixture then enters separator 16, where the oil is separated from the water and surfactant. Separator 16 utilizes physical techniques of separation such as gravimetric settling. The water phase containing surfactant produced by separator 16 is then introduced into ultrafilter 12, where the surfactant is concentrated. The surfactant produced from ultrafilter 12 can be reused in further chemical flooding operations.

FIG. 4 shows an embodiment identical to that of FIG. 3 with the exception that ultrafilter 10 is replaced by separator 18, which utilizes conventional methods for breaking oil/water/surfactant emulsions. In particular, physical separation such as heating or chemical separation such as the addition of polyvalent salts is used. In all other respects, the operation is the same as that in FIG. 3.

VARIATIONS AND MODIFICATIONS

Typical surfactants to be recovered are anionic petroleum sulfonates, cationic quaternary ammonium compounds, and nonionic surfactants such as polyoxyethylene.

Shifting the partitioning in favor of one phase or the other can be done by adjusting the characteristics of the ultrafilter membrane, such as varying the membrane pore size, as well as by adding cosurfactant.

The membranes selected can be either hydrophilic or oleophilic. The Abcor HFA is a hydrophilic membrane.

A reverse osmosis membrane can be substituted for ultrafilter 12. Generally, reverse osmosis involves application of higher pressures than ultrafiltration and hence may require more expensive pressurizing equipment. However, it may be necessary to resort to reverse osmosis when the molecular size difference between surfactant and water is not large enough for ultrafiltration. In all these barrier separation processes a separation of components results from the different transport rates of the various components in a semipermeable membrane under the driving force of gradients in their chemical potentials. *Ultrafiltration* differs from *reverse osmosis* and *ordinary filtration* in the size of the solute or particle separated. Ultrafiltration applies to solutes or colloidal particles greater than about 20 A in diameter (molecular weight $>1,000$), while reverse osmosis is potentially capable of separating particles whose molecular dimensions are comparable to those of the solvent, and filtration applies to particles greater than about 1 $\mu$m in diameter. In addition to the size of the particles to be separated from a solution, the three processes also differ significantly in the hydrostatic pressure applied or driving force for the separation processes: approximately atmospheric pressure is used for filtration, 1 to 10 atmospheres for ultrafiltration, and 10 to 100 atmospheres for reverse osmosis.

Ultrafiltration membranes are microporous in their structure; i.e., rigid and highly voided with randomly distributed interconnected pores ranging in size from 10 to 1,000 A. Separation is achieved by the pore size distribution. All particles larger than the largest pores in the membrane matrix are rejected, while all particles smaller than the smallest pores are passes through the membrane, and intermediate size particles are rejected in correspondence with the pore size distribution. Ultrafiltrations can be used for concentration, purification or separation. Separation of two or more species differing in molecular weight can be effected by ultrafiltration if the molecular weight difference is fairly large (safety, a factor of 10). Most commercial ultrafiltration membranes have a fairly wide pore size distribution which leads to a fairly diffuse molecular weight "cutoff," so that only slight separations can be obtained if the molecules of interest are close in molecular weight.

The basic difference between reverse osmosis and ultrafiltration lies in the size of the solute that is separated from a solvent under the driving force of a hydrostatic pressure. Reverse osmosis is used for separation with solutes up to a molecular weight of about 500. To effect this separation, a microporous membrane is not suitable. A homogeneous membrane, usually configured as an asymmetric membrane with a homogeneous skin, is used. The homogeneous membrane is essentially a film through which a mixture of chemical species is transported via molecular diffusion. The separation of the various components in the mixture is related to their transport rates within the film, which are determined by the diffusivities and concentrations of the individual components in the film. Particles of exactly the same size can be separated when their solubilities in the film differ significantly. A solution of particles that have a molecular weight of 500 or less may have a significant osmotic pressure, perhaps as high as 100 atmospheres, depending on the concentration of the solution. To effect any separation this osmotic pressure must be overcome by an applied hydrostatic pressure which thus must be significantly higher than in ultrafiltration.

In another variation, water wash 14 can comprise several consecutive wash stages, to improve extraction of surfactant from the oil phase.

Finally, separator 16 can also utilize heating or chemical techniques, such as the addition of polyvalent salts, or it can employ ultrafiltration or reverse osmosis.

Other embodiments of the invention will be obvious to those skilled in the art.

What is claimed is:

1. Apparatus for recovering surfactant from an undefined oil/water/surfactant emulsion obtained from an oilfield after chemical flooding thereof, which apparatus comprises:
    a first ultrafilter for breaking said emulsion into a water phase and an oil phase, each of said phases containing surfactant,
    means for washing with water the oil phase produced by said first ultrafilter to extract surfactant from said oil phase, said washing means being connected to an outlet from said first ultrafilter,
    means for separating said oil phase from said water used for washing and extracted surfactant, said separating means being connected to an outlet from said washing means, and
    a second ultrafilter connected to an outlet from said first ultrafilter so as to receive the water phase produced by said ultrafilter and connected to an outlet from said separating means so as to receive wash water and surfactant therefrom, said second ultrafilter recovering surfactant from said water phase and wash water,
    said second ultrafilter having an outlet connected to an inlet of said washing means to provide water for said washing means.

2. The surfactant recovery apparatus of claim 1 wherein said washing means comprises a plurality of stages.

* * * * *